(12) United States Patent
Nie et al.

(10) Patent No.: US 12,136,263 B2
(45) Date of Patent: Nov. 5, 2024

(54) METHOD AND SYSTEM FOR IMAGE BATCH PROCESSING RECOGNITION

(71) Applicant: SINOSTEEL MAANSHAN GENERAL INSTITUTE OF MINING RESEARCH CO., LTD, Ma'anshan (CN)

(72) Inventors: Wen Nie, Ma'anshan (CN); Canming Yuan, Ma'anshan (CN); Chuanhua Xu, Ma'anshan (CN); Bibo Dai, Ma'anshan (CN); Junxing Zhu, Ma'anshan (CN); Xuemin Zeng, Ma'anshan (CN); Xiaogang Wu, Ma'anshan (CN); Xing Wang, Ma'anshan (CN)

(73) Assignee: SINOSTEEL MAANSHAN GENERAL INSTITUTE OF MINING RESEARCH CO., LTD, Ma'anshan (CN)

( * ) Notice: Subject to any disclaimer, the term of this patent is extended or adjusted under 35 U.S.C. 154(b) by 0 days.

(21) Appl. No.: 18/617,046

(22) Filed: Mar. 26, 2024

(65) Prior Publication Data
US 2024/0233360 A1    Jul. 11, 2024

Related U.S. Application Data

(63) Continuation of application No. PCT/CN2023/075435, filed on Feb. 10, 2023.

(30) Foreign Application Priority Data

Apr. 20, 2022   (CN) .......................... 202210414409.2

(51) Int. Cl.
G06V 10/70   (2022.01)
G06T 7/00    (2017.01)
(Continued)

(52) U.S. Cl.
CPC ............ *G06V 10/87* (2022.01); *G06T 7/0002* (2013.01); *G06T 7/136* (2017.01); *G06T 7/187* (2017.01);
(Continued)

(58) Field of Classification Search
CPC ...... G06V 10/87; G06V 10/267; G06V 10/80; G06T 7/0002; G06T 7/136; G06T 7/187; G06T 2207/20004
See application file for complete search history.

(56) References Cited

U.S. PATENT DOCUMENTS

2018/0137612 A1   5/2018  Li et al.
2019/0385327 A1   12/2019 Nonaka et al.

FOREIGN PATENT DOCUMENTS

| CN | 101216891 A | 7/2008 |
|---|---|---|
| CN | 101576998 A | 11/2009 |

(Continued)

OTHER PUBLICATIONS

Zaitoun, N.M. and Aqel, M.J., 2015. Survey on image segmentation techniques. Procedia Computer Science, 65, pp. 797-806.*

(Continued)

*Primary Examiner* — Zhitong Chen
(74) *Attorney, Agent, or Firm* — Pilloff Passino & Cosenza, LLP; Rachel Pilloff; Sean Passino

(57) ABSTRACT

Provided are a method and a system for image batch processing recognition. Improved adaptive threshold segmentation, regional growth segmentation and global threshold segmentation methods are used to recognize red sandstone samples in a process of uniaxial compression failure in a certain area of Yunnan. In an embodiment, batch recognition times and relative errors of partial recognition images are calculated.

3 Claims, 3 Drawing Sheets

(51) Int. Cl.
*G06T 7/136* (2017.01)
*G06T 7/187* (2017.01)
*G06V 10/26* (2022.01)
*G06V 10/80* (2022.01)

(52) U.S. Cl.
CPC ............ *G06V 10/267* (2022.01); *G06V 10/80* (2022.01); *G06T 2207/20004* (2013.01)

(56) References Cited

FOREIGN PATENT DOCUMENTS

| | | | | |
|---|---|---|---|---|
| CN | 103364410 | A | | 10/2013 |
| CN | 105719275 | A | * | 6/2016 ............... G06T 7/00 |
| CN | 110378879 | A | | 10/2019 |
| CN | 111145161 | A | | 5/2020 |
| CN | 113159052 | A | | 7/2021 |
| CN | 113870263 | A | | 12/2021 |
| CN | 14743106 | A | | 7/2022 |
| JP | 2007018037 | A | | 1/2007 |
| WO | 2016172827 | A1 | | 11/2016 |

OTHER PUBLICATIONS

Kapsalas, P., Zervakis, M. and Maravelaki-Kalaitzaki, P., 2007. Evaluation of image segmentation approaches for non-destructive detection and quantification of corrosion damage on stonework. Corrosion Science, 49(12), pp. 4415-4442.*

Huang Xiu-Qin et al., "An on-line surface inspection system for aluminum strip," Light Alloy Fabrication Technology, Dec. 2014, pp. 40-45, vol. 42, No. 12.

Zhao Yonghong et al., Deformation Management of Rock Damage by Digital Image Correlation Method, Chinese Journal of Rock Mechanics and Engineering, Jan. 2002, pp. 73-76, vol. 21, No. 1.

Yan Zhaosong, "Experimental Research on Rock Deformation Characteristics and Deformation Localization Evolution Based on 3D-DIC Technology," Jun. 2019.

Abdul Rahim Ahmad et al., "Image Segmentation for Pavement Crack Detection System," Aug. 2020, p. 153-157, 2020 10th IEEE International Conference on Control System, Computing and Engineering.

First Office Action for China Application No. 202210414409.2, mailed Sep. 2, 2022.

Ma Xiang, "Research on Surface Defect Detection Technology of Cartridges Based on Machine Vision," Dec. 2019.

Luo Hui, "Study on road surface damage detection based on deep learning and binocular stereo vision," Jun. 2021.

Notification to Grant Patent for China Application No. 202210414409.2, mailed Nov. 2, 2022.

First Search Report for China Application No. 202210414409.2, dated Aug. 25, 2022.

Supplementary Search Report for China Application No. 202210414409.2, dated Oct. 21, 2022.

International Search Report and Written Opinion for PCT/CN2023/075435, mailed May 10, 2023.

* cited by examiner

METHOD AND SYSTEM FOR IMAGE BATCH PROCESSING RECOGNITION

CROSS-REFERENCE TO RELATED APPLICATIONS

This disclosure is a continuation of PCT/CN2023/075435, filed on Feb. 10, 2023 and claims priority of Chinese Patent Application No. 202210414409.2, filed on Apr. 20, 2022, the contents of which are hereby incorporated by reference.

TECHNICAL FIELD

The disclosure belongs to the technical field of image recognition, and in particular to a method and a system for image batch processing recognition.

BACKGROUND

It is important to know characteristics of rocks quickly and accurately. Some scholars have done a lot of research on the characteristics through uniaxial compression, triaxial compression, direct shear test and acoustic emission in the laboratory. However, complexity of data processing in the later period consumes a lot of time and manpower of researchers. Therefore, in the prior art, many methods for recognition of deformation regions of rocks by using computer vision technology are proposed, which saves some human resources. For example, a recognition method of rock-soil interface and corrosion fissures based on color provides a reference for engineering application to identify borehole rock structure. Improved chaos-based semi-supervised Support Vector Machine Fuzzy C-means (SVM-FCM) algorithm (Consensus Support Vector Machine Fuzzy C-means) is used to segment rock images, and effectiveness of different image segmentation techniques is compared in an analysis of porous media image data.

With research problems becoming more and more complicated and changeable, a single image segmentation method is no longer suitable for dealing with complex types of images. Therefore, in the prior art, there are many methods for image segmentation through method superposition and improvement and image multi-information combination processing. For example, a multi-target image segmentation method divides images into different groups by finding a best threshold. In addition, a new lung segmentation method based on multi-strategy fusion, may accurately segment a lung region from a computed tomography (CT) slice. Methods of semantic segmentation of crack pixels in high-resolution images by Convolutional Neural Network-to-Fully Convolutional Network (CNN-to-FCN) also included.

However, these methods are usually used to segment a single image and are not suitable for a large number of images.

SUMMARY

It is an object of the disclosure to provide a method and a system for image batch processing recognition to solve the above problems in the prior art.

On the one hand, in order to achieve the above object, the disclosure provides a method for image batch processing recognition, including:

acquiring image data, and pre-processing the image data to obtain pre-processed images;

selecting image segmentation methods based on the pre-processed images, performing segmentation based on the different image segmentation methods, and obtaining several segmentation results; and fusing the several segmentation results, and using an obtained fusion result as a final recognition result.

Optionally, the image data adopts image data in open source libraries of Python and OpenCV.

Optionally, a process of pre-processing the image data to obtain pre-processed images includes:

naming all the image data in sequence, and cropping original images and reserving regions to be processed to obtain the pre-processed images.

Optionally, in a process of selecting the image segmentation methods based on the pre-processed images, the image segmentation methods include: a threshold-based image segmentation method, an edge-based image segmentation method, a region-based image segmentation method and a clustering-based image segmentation method.

Optionally, the process of selecting the image segmentation methods based on the pre-processed images includes:

selecting an adaptive threshold segmentation method and a global threshold segmentation method based on a threshold of the pre-processed images; and based on regions of the pre-processed images, selecting a region growing segmentation method.

In the threshold-based image segmentation method, adaptive threshold segmentation is suitable for recognizing long fracture regions in a uniaxial compression process of rock samples, while various damage regions recognized by global threshold segmentation have less intersection, so required parts may be extracted separately.

In the region-based image segmentation method, region growing segmentation is suitable for recognizing large area damaged regions of the rock samples during uniaxial compression.

Adaptive threshold segmentation is combined with image contrast to recognize long fractures. Region growing segmentation is combined with image brightness, and then global threshold segmentation results are superimposed to recognize regions with both long fractures and large area damage, so as to achieve a final recognition result.

Optionally, a process of performing segmentation based on the different image segmentation methods, and obtaining several segmentation results, and fusing the several segmentation results, and using an obtained fusion result as a final recognition result includes:

after combining the adaptive threshold segmentation method with image contrast, recognizing the long fracture regions in the rock samples in the pre-processed images to obtain the long fractures;

recognizing damage regions in the pre-processed images based on the global threshold segmentation method; recognizing damage regions in the pre-processed images based on the region growing segmentation method; and combing the damage regions with image brightness and then superimposing with the damage regions to obtain a batch processing recognition result.

On the other hand, in order to achieve the above object, the disclosure provides a system for image batch processing recognition, including:

a database module, a rock uniaxial compression deformation information acquisition module and a comparison and error analysis module;

the database module is used for providing image data for image batch recognition;

the rock uniaxial compression deformation information acquisition module is used for automatically extracting rock deformation information; and the comparison and error analysis module is used for calculating relative errors.

Optionally, the database module adopts libraries of Python and OpenCV.

Optionally, the rock uniaxial compression deformation information acquisition module includes a high-speed camera; and the high-speed camera is used for automatically shooting continuous rock deformation information.

Optionally, the comparison and error analysis module is also used for comparing with recognition times of a traditional image recognition method.

Technical effects of the disclosure are as follows.

Firstly, in an early stage of batch processing, the disclosure may select appropriate methods for batch recognition according to characteristics of images. The disclosure may be applied to recognition of other types of rock failure regions and has strong expansibility.

Secondly, the disclosure realizes automatic batch recognition of rock deformation regions and provides a method for the automatic recognition of the rock deformation regions.

Thirdly, the disclosure reduces times and human resources of researchers in indoor rock property research.

BRIEF DESCRIPTION OF THE DRAWINGS

Accompanying drawings, which form a part of this disclosure, are used to provide a further understanding of this disclosure, and illustrative embodiments of this disclosure and their descriptions are used to explain this disclosure, and do not constitute an improper limitation of this disclosure. In the attached drawings.

DETAILED DESCRIPTION OF THE EMBODIMENTS

It should be noted that embodiments in this disclosure and features in the embodiments may be combined with each other without conflict. The disclosure will be described in detail with reference to attached drawings and embodiments.

It should be noted that steps shown in a flowchart of accompanying drawings may be executed in a computer system such as a set of computer-executable instructions, and although a logical order is shown in the flowchart, in some cases, the steps shown or described may be executed in a different order from here.

Embodiment 1

Figure 1:
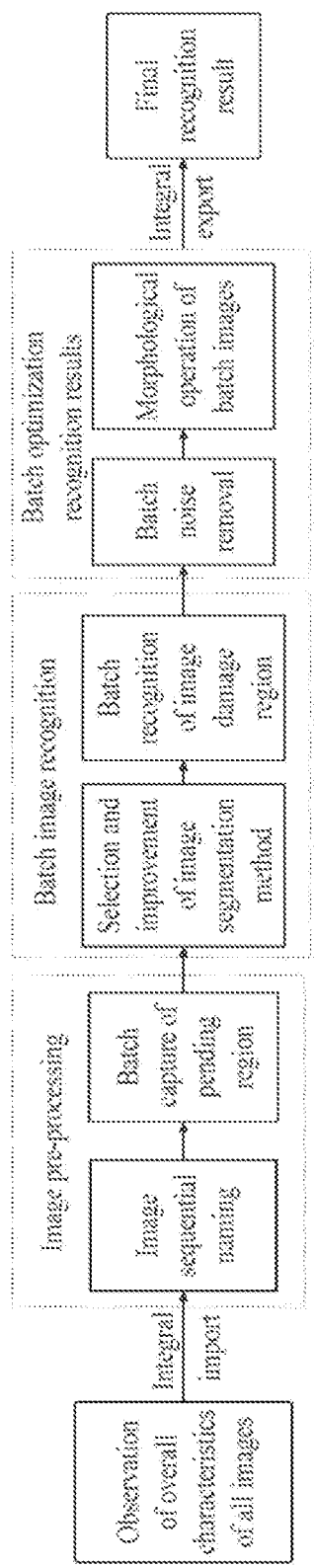
FIG. 1 is an overall flowchart in an embodiment of the disclosure.

As shown in FIG. 1, this embodiment provides a method and a system for image batch processing recognition. The disclosure is based on libraries of Python and OpenCV, and combines with various image segmentation methods to recognize rock failure regions, including:

firstly, pre-processing images is conducted.

Image data saved in experiments are always named confusedly, and the images also contain some irrelevant background regions, which leads to information confusion and reduces an efficiency of image batch processing. There is a need to name all the images in sequence, crop original images and keep regions to be processed.

Image batch processing recognition is performed.

The information presented by a large number of image samples is complex, and it is difficult to recognize all the images by a single method. It is necessary to use various image segmentation methods for recognition of a large number of images. Image segmentation methods based on threshold, edge, region and clustering are mostly simple and effective, which may be used to obtain key feature information of images and improve an efficiency of an image analysis. The above four image segmentation methods are selected to recognize different types of damage regions of a small number of rocks, so as to find a suitable segmentation method for the damage regions.

After selecting the image segmentation methods, it is usually necessary to improve different methods, such as combining a region growing segmentation method with image brightness, and combining an adaptive threshold segmentation method with image contrast. Then, all kinds of modified methods are fused, so that different methods may run continuously and do not interfere with each other, and automatic batch recognition of rock failure images is realized.

Batch optimization of recognition results is carried out.

Initial batch recognition images usually contain a lot of noise and present features that are not connected with other regions, and the noise should be removed. At the same time, if there is a lot of noise near target boundaries and at junctions in initial recognition result images, an image morphological operation is needed to eliminate an influence of the noise.

A uniaxial compression test is conducted.

The rock samples are prepared.

Materials selected in this experiment are red sandstone from a certain place. Cylindrical rock samples with a size of 50*100 mm are prepared and pre-cracked (initial crack lengths are 0 mm, 5 mm, 10 mm, 15 mm and 25 mm, and crack dip angles are 0°, 30°, 45° and 60°). According to different water contents of the rock samples, the rock samples are divided into three states, and a water content of the rock samples in a normal state is 0.91%. Some rock samples are dried by 101—A blast electric heating constant temperature drying oven until the water content is 0%. Some rock samples are soaked until the water content reaches saturated water content of 5.06%.

Uniaxial compression process and data storage.

A Mechanical Testing & Simulation (MTS) electro-hydraulic servo universal testing machine is used to carry out a 200 N uniaxial compression test on the rock samples. During the test, a high-speed camera (1280*1024 resolution, FPS: 2000 frames per second) is used to record a whole process of rock sample compression. Saved data is placed in a specific folder, such as A-0-0 (a first parameter represents different water contents of a rock sample: A represents a dry state, B represents a normal state, and C represents a saturation state; a second parameter indicates a length of rock sample presplitting, and a third parameter represents an angle between rock sample presplitting and a parallel line).

Figure 2:
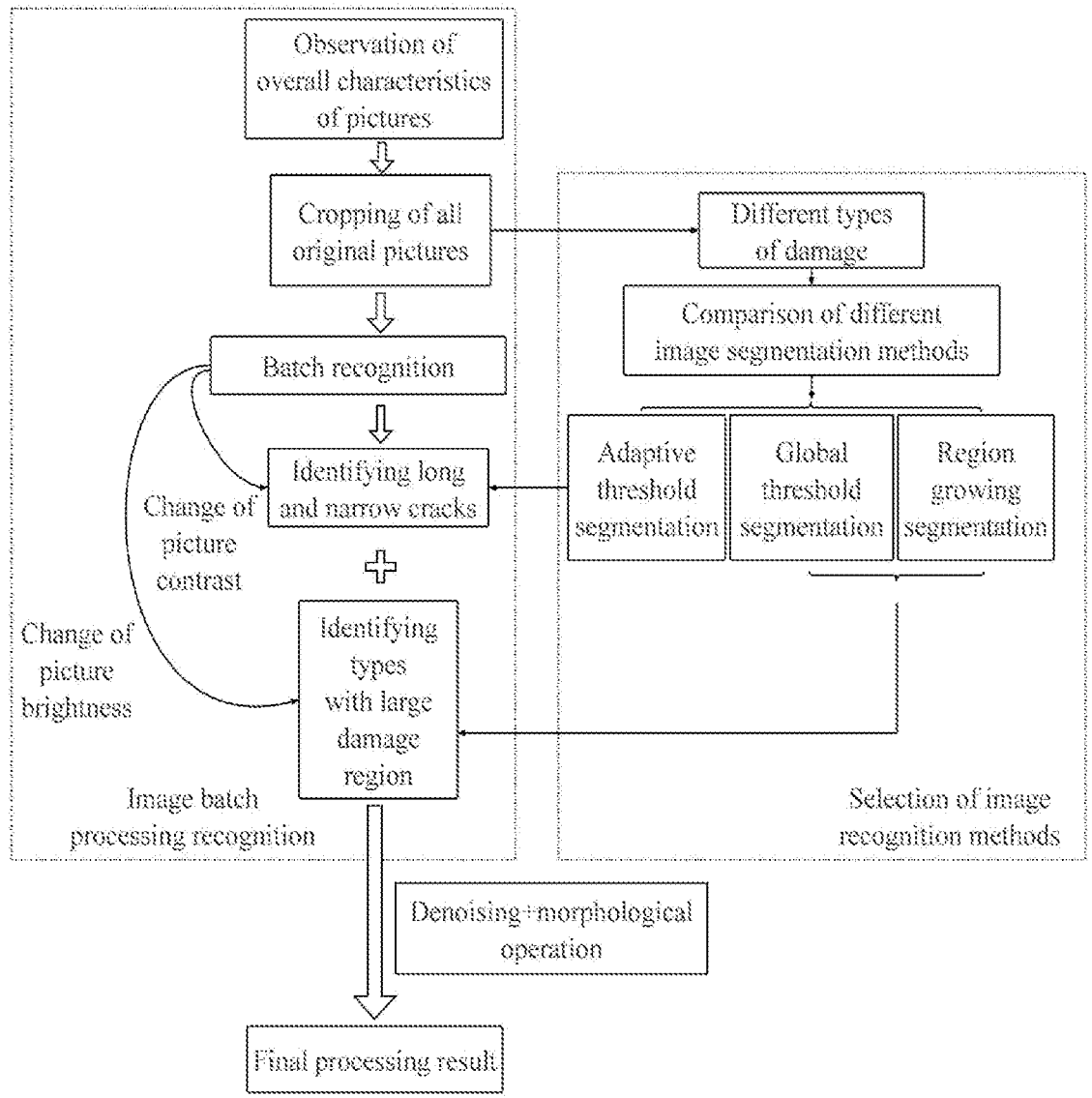
FIG. 2 is a flowchart of a specific application in an embodiment of the disclosure.

A specific application of batch recognition of red sandstone failure regions is shown in FIG. 2.

(1) A total of 359 pictures are saved in the experiment, and numbers of the pictures in group A, group B and group C are the same, with 104 pictures. Group D has 47 pictures.

The pictures need to be renamed.

(2) The recognition of irrelevant background increases the difficulty of batch processing and makes data processing more complicated. Therefore, 359 original images are cropped in batches by using the small change of physical coordinates in an recognition region of the rock samples. Moreover, the code should be guaranteed to run continuously.

(3) Among the image segmentation methods based on threshold, edge, region and clustering, different small methods are selected for recognition: based on threshold, small methods selected by the disclosure are global threshold segmentation, local threshold segmentation and OTSU'S threshold segmentation; based on edge, small methods selected by the disclosure are sobel, scharr, laplacian and canny operators; based on region, the disclosure selects a region growing algorithm; based on clustering, the disclosure selects a simple linear iterative cluster (SLIC) superpixel segmentation method. Among these four categories of image segmentation methods, there are other sub-categories of image segmentation methods, but they are not as widely used as the above-mentioned methods, and they are not suitable for the recognition of rock damage regions in the disclosure after several pictures of rock damage have been used for recognition and verification in an early stage.

(4) Comparison, selection and improvement of the methods: in the threshold-based image segmentation method, adaptive threshold segmentation is suitable for recognizing long fracture regions in the rock samples during uniaxial compression, in which uniaxial compression is a process of experiment, and some data are needed for method verification and specific implementation stages. These data are from pictures of the rock uniaxial compression process. However, failure regions recognized by global threshold segmentation are less intersected, so required parts may be extracted separately, and global threshold segmentation is used to recognize the damage regions of rocks. In the region-based image segmentation method, region growing segmentation is suitable for recognizing large area damage regions of the rock samples during uniaxial compression. Adaptive threshold segmentation is combined with image contrast to recognize long fractures. Region growing segmentation is combined with image brightness, and then global threshold segmentation results are superimposed to recognize regions with both the long fractures and large area damage, so as to achieve a final recognition result.

(5) Through observation, it is found that there are burrs and small area connected regions in a binary graph. Therefore, morphological opening and closing operation is used to remove the burrs, and image inversion is used to remove small areas, so as to remove small connected regions and make the result more perfect.

At this time, a main process of rock batch recognition has been determined, but continuity of the process is also essential.

Firstly, 359 images are pre-processed in batches. The process includes:

sequential renaming (1-359), cropping, contrast change and brightness change.

Secondly, 359 images with varying contrast are segmented by using the adaptive threshold segmentation method, and a recognition result of narrow fractures are output.

At the same time, 359 images with varying brightness are segmented by global threshold segmentation and region growing segmentation, and a recognition result of severely damaged regions are output.

After the two recognition results are superimposed, 359 recognition result graphs are obtained.

Finally, the recognition result graphs are denoised and morphologically processed in batches to reduce recognition errors.

Another object of the disclosure is to provide an image recognition system for implementing the image recognition method, where the image recognition system includes:

a database module, using the open source libraries of Python and OpenCV;

a rock uniaxial compression deformation information acquisition module, combined with advanced high-speed camera shooting technology, automatically extracting continuous rock deformation information; and a comparison and error analysis module for calculating relative errors (comparing with actual damage regions) and comparing with recognition times of a traditional image recognition method.

Another object of the disclosure is to provide a batch recognition method of rock deformation regions, and the batch recognition method of rock deformation regions uses the image recognition method.

1) A relative error analysis according to Table 1 shows that, according to the method according to the disclosure, a relative error value is 10.88% in an X direction and 8.60% in a Y direction. This automatic batch recognition method is effective.

(2) HaSee Ares TXI-CUA notebook computer is used to run the code to recognize the damage regions of the 359 images.

Figure 3:
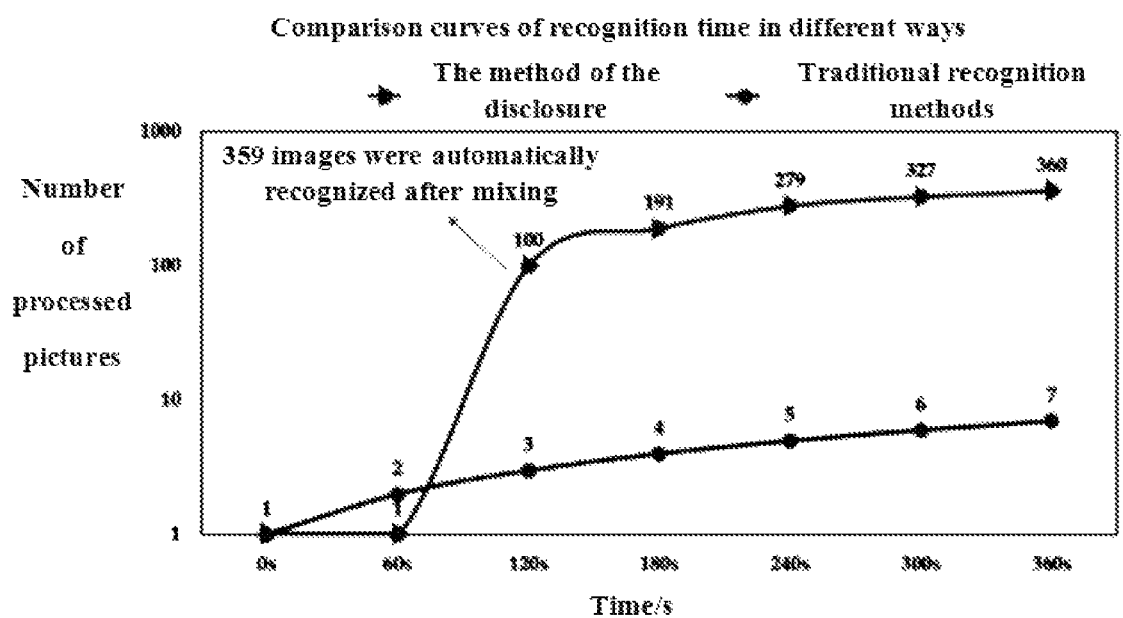
FIG. 3 is a comparison diagram of recognition times in an embodiment of the disclosure.

The code is run 3 times and averaged. The time is about 5'56.83". At the same time, the traditional method is used to recognize different groups of images, and the result shows that it takes 60 seconds for the traditional method to recognize each image on a premise that an accuracy is similar to that of the batch recognition method, as shown in FIG. 3.

TABLE 1

| | Relative error | |
| --- | --- | --- |
| Group | Relative error in X direction/% | Relative error in Y direction/% |
| A | 10.09 | 7.38 |
| B | 12.03 | 8.96 |
| C | 11.16 | 10.06 |
| D | 6.53 | 5.06 |
| Average value | 10.88 | 8.60 |

In this embodiment, 359 images of red sandstone samples damaged by uniaxial compression are recognized. The disclosure has positive effects and advantages as follows.

The disclosure realizes automatic batch recognition of rock failure regions, and save manpower, material resources and time in a research process. The improved adaptive threshold segmentation, regional growth segmentation and global threshold segmentation methods are used to recognize the red sandstone samples in the process of uniaxial compression failure in a certain area of Yunnan. In the embodiment, the batch recognition times and the relative errors of partial recognition images are calculated. The data shows that the method may automatically recognize a large number of red sandstone fractures, and at the same time keep an recognition accuracy and a recognition time within a controllable range.

The significance of solving the above problems and defects is that with method according to the disclosure the recognition time of rock failure regions may be greatly reduced by researchers when studying rock properties indoors, and the accuracy is within an allowable range. The combination of the improved image segmentation methods and image features may greatly improve the accuracy of recognizing different failure types of rocks. The disclosure may effectively support researchers' work of extracting rock failure regions. In the field of engineering geology, this technology will play an important role in the study of rock properties.

The above is only a better specific embodiment of this disclosure, but a protection scope of this disclosure is not limited to this. Any change or replacement that may be easily thought of by a person familiar with this technical field within a technical scope disclosed in this disclosure should be covered by this disclosure. Therefore, the protection scope of this disclosure should be based on a protection scope of claims.

What is claimed is:

1. A method for image batch processing recognition, comprising following steps:
    acquiring image data, and pre-processing the image data to obtain pre-processed images;
    selecting different image segmentation methods based on the pre-processed images, performing segmentation based on the different image segmentation methods, and obtaining several segmentation results; and
    fusing the several segmentation results, and using an obtained fusion result as a final recognition result;
    wherein in a process of selecting the image segmentation methods based on the pre-processed images, the image segmentation methods comprise: a threshold-based image segmentation method, an edge-based image segmentation method, a region-based image segmentation method and a clustering-based image segmentation method;
    the process of selecting the image segmentation methods based on the pre-processed images comprises:
    selecting an adaptive threshold segmentation method and a global threshold segmentation method based on a threshold of the pre-processed images; and
    based on regions of the pre-processed images, selecting a region growing segmentation method;
    a process of performing segmentation based on the different image segmentation methods, and obtaining several segmentation results, and fusing the several segmentation results, and using an obtained fusion result as a final recognition result comprises:
    after combining the adaptive threshold segmentation method with image contrast, recognizing long fracture regions in rock samples in the pre-processed images to obtain a long-narrow fracture recognition result;
    combining the global threshold segmentation method and the region growing segmentation method with image brightness to obtain a recognition result of severely damaged regions; and
    superimposing the long-narrow fracture recognition result and the recognition result of the severely damaged regions to obtain a batch processing recognition result.

2. The method according to claim 1, wherein the image data adopts image data in open source libraries of Python and OpenCV.

3. The method according to claim 1, wherein a process of pre-processing the image data to obtain pre-processed images comprises:
    naming all the image data in sequence, and cropping original images and reserving regions to be processed to obtain the pre-processed images.

* * * * *